United States Patent [19]
Phillips

[11] 4,415,133
[45] Nov. 15, 1983

[54] SOLAR POWERED AIRCRAFT

[75] Inventor: William H. Phillips, Hampton, Va.

[73] Assignee: The United States of America as represented by the Administrator of the National Aeronautics and Space Administration, Washington, D.C.

[21] Appl. No.: 263,829

[22] Filed: May 15, 1981

[51] Int. Cl.³ .............................................. B64D 27/02
[52] U.S. Cl. ..................... 244/53 R; 244/13; 244/45 R; 244/91; 244/55
[58] Field of Search ............... 244/53 R, 58, 13, 45 R, 244/91, 55, 37; D12/341, 331

[56] References Cited

U.S. PATENT DOCUMENTS

| | | | |
|---|---|---|---|
| D. 144,067 | 3/1946 | Paglia | D12/331 |
| 1,048,835 | 12/1912 | Hyde et al. | 244/45 R |
| 1,881,034 | 10/1932 | Smith et al. | 244/45 R |
| 2,643,076 | 6/1953 | Hurel | 244/37 |
| 3,089,620 | 5/1963 | Johnson | 244/53 R |
| 3,774,865 | 11/1973 | Pinto | 244/53 R UX |
| 4,262,864 | 4/1981 | Eshoo | 244/31 |
| 4,361,295 | 11/1982 | Wenzel | 244/33 |
| 4,364,532 | 12/1982 | Stark | 244/30 |

OTHER PUBLICATIONS

"U.K.'s First Solar Aircraft Takes Off", Flight International 6/30/79, p. 2336.
Cowley "Wings in the Sun", Flight International Jun. 13 1981, pp. 1865–1868.

*Primary Examiner*—Galen L. Barefoot
*Attorney, Agent, or Firm*—Howard J. Osborn; John R. Manning; Wallace J. Nelson

[57] ABSTRACT

A cruciform wing structure for a solar powered aircraft is disclosed. Solar cells 28 are mounted on horizontal wing surfaces 20, 22. Wing surfaces 24, 26 with spanwise axis perpendicular to surfaces 20, 22 maintain these surfaces normal to the sun's rays by allowing aircraft to be flown in a controlled pattern at a large bank angle.

The solar airplane may be of conventional design with respect to fuselage, propeller and tail, or may be constructed around a core 70 and driven by propeller mechanisms 75, 76, 77, and 78 attached near the tips of the airfoils.

10 Claims, 2 Drawing Figures

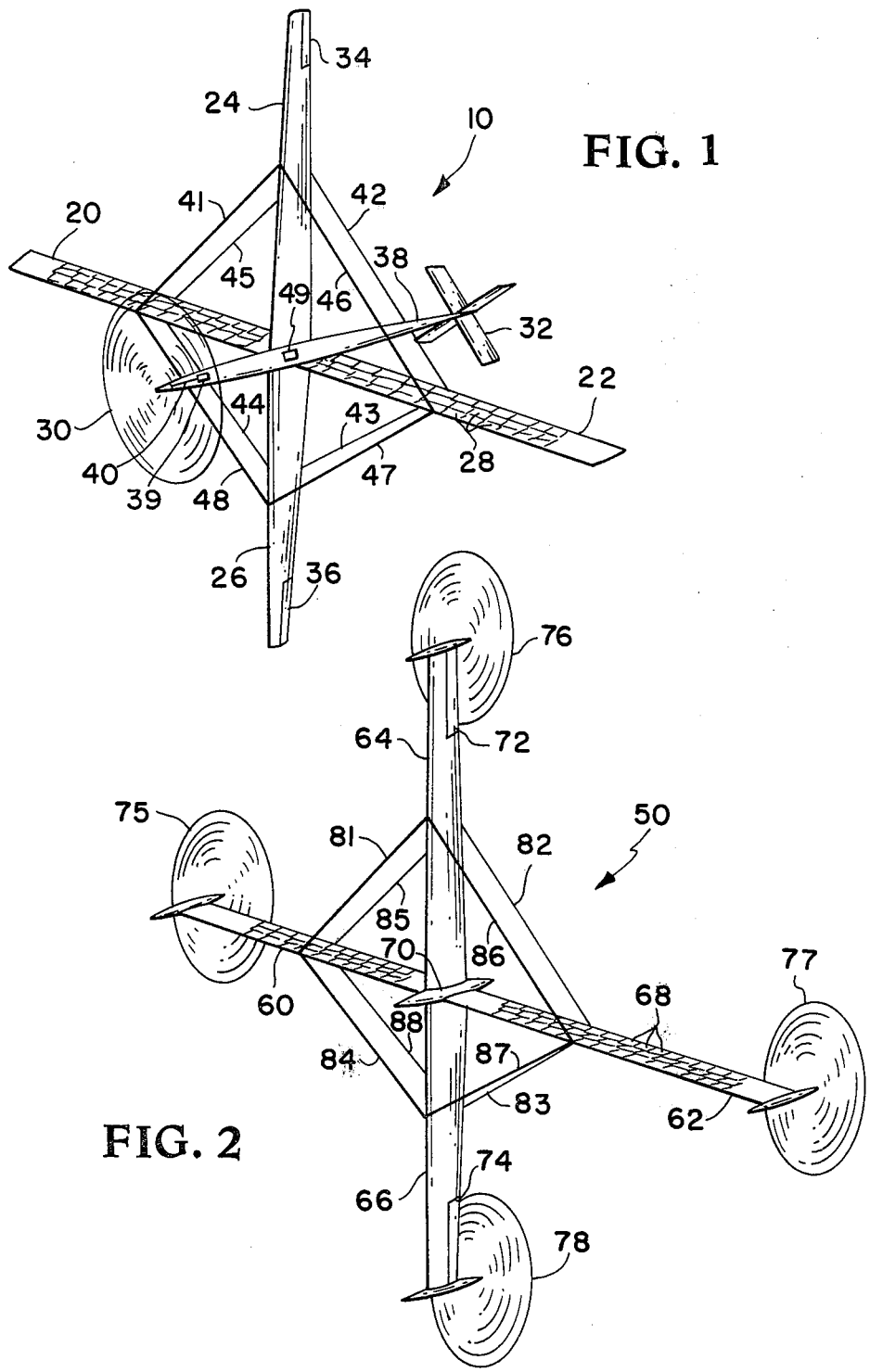

SOLAR POWERED AIRCRAFT

ORIGIN OF THE INVENTION

The invention described herein was made by an employee of the United States Government and may be used by or for the Government for governmental purposes without the payment of any royalties thereon or therefor.

BACKGROUND OF THE INVENTION

This invention relates to solar energy and in particular to a wing design for a solar powered aircraft.

A solar powered aircraft is one which derives energy from the sun's rays by means of photovoltaic solar cells. This energy may be transformed for use in an electric motor to power the aircraft. Excess energy is stored either as potential energy in the form of increased altitude of the aircraft, or as energy stored onboard in batteries or in some other energy storage system. The stored energy is used to keep the vehicle aloft during the night, so that flight time is not limited by fuel supply as it is on a conventional aircraft. The vehicle must fly at an altitude high enough to be above the clouds, and to avoid winds with velocities much higher than the airspeed of the vehicle. Because of its long endurance and limited weight-carrying ability, this type of vehicle is normally considered to be a pilotless aircraft.

Prior art discloses solar powered aircraft, of conventional configuration with solar cells on top of the wing or fuselage. U.S. Pat. No. 3,089,670 describes an aircraft wherein the wing surfaces are provided with solar cells. A rotary type (flying saucer) aircraft with solar cells located on rotor blades is disclosed in U.S. Pat. No. 3,744,865. For both of these aircraft, the energy available is maximum when the sun is directly overhead, and decreases approximately as the cosine of the angle from the normal to the plane of the solar cells. Operation of such solar powered aircraft is therefore limited by the position of the sun.

Desired capabilities of a solar powered aircraft include the ability to remain airborne for an indefinite length of time, and to maintain a station over a desired location. To accomplish these ends, the ability to recover the maximum possible solar energy must be maintained throughout daylight hours. One method for maintaining the output of solar cells at various sun angles involves placing the solar cells in vertical as well as horizontal planes. To perform station keeping, the aircraft must fly a racetrack pattern, and solar cells are required on both sides of the wing and fuselage. This increases by a factor of three the area of solar cells required to yield a power output throughout the daylight hours equal to that produced with cells only on the top of the wing and the sun directly overhead. The obvious weight disadvantage makes this option impractical.

Banking the aircraft so that the normal to the wing always lies along the sun line would eliminate the weight disadvantage just described. A conventional aircraft, however, cannot maintain straight flight at a large bank angle.

Also suggested has been placement of solar cells on a tilting panel within a transparent fuselage structure. Such placement would require inclusion of a cooling system for inner cells; the associated weight and aerodynamic drag penalties again limit the feasibility of the concept.

U.S. Pat. No. 3,025,027 describes a vertical airfoil which produces a lift and may support an aircraft in flight. One such vertical airfoil is used with two horizontal airfoils.

An object of the present invention is to provide a solar powered aircraft which can maintain maximum exposure of its solar cells to the sun.

An object of the present invention is to allow full power output of solar cells at any location on earth and at any time during daylight hours.

Another object of the present invention is to provide such an aircraft, which aircraft may be banked to align its solar cells normal to the sun line.

Another object of the present invention is to provide such an aircraft, which aircraft may be guided to fly a station-keeping pattern.

Another object of the present invention is to provide such an aircraft, wherein solar cells are located on only one airfoil surface.

SUMMARY OF THE INVENTION

These and other objects are accomplished by a cruciform wing structure for a solar powered aircraft. One surface of one of the wings is equipped with solar cells. A second wing whose spanwise axis is normal to that of the first wing maintains the solar cells normal to the sun line. The aircraft may be banked and flown in the racetrack pattern necessary for station keeping.

BRIEF DESCRIPTION OF THE DRAWINGS

The details of this invention will be described herein in connection with the accompanying drawings, wherein:

FIG. 1 shows a perspective view of a solar powered aircraft with cruciform wing design; and FIG. 2 shows an alternative embodiment of the present invention, wherein the tail and fuselage are eliminated and propellers are positioned on the wing tips.

DETAILED DESCRIPTION OF THE INVENTION

Referring now to FIG. 1, there is seen an embodiment of the present invention, designated generally by the reference numeral 10. The solar-powered airplane 10 employs a cruciform wing design which allows straight flight at even a large bank angle. Airfoils 20, 22 are attached to fuselage 38. Airfoils 24, 26 with spanwise axis perpendicular to airfoils 20, 22 are also attached to fuselage 38. Propeller 30 and tail 32 are attached at the ends of fuselage 38. Tail 32 may be constructed in cruciform design similar to that of the airfoils.

Airfoils 20, 22 are provided with photo-voltaic solar cells 28 on the surface to be facing the sun. Airfoils 24, 26 have ailerons 34, 36 for added control and stability. Bracing wires 41, 42 43, 44, 45, 46, 47 and 48 complete this embodiment of the solar-powered airplane 10. To provide torsional stiffness the braces may be crossed to form X-shaped bracing, or an additional brace wire may be added to form N-shaped bracing.

FIG. 2 shows an alternate embodiment of the solar-powered airplane, designated generally by the reference number 50. Airfoils 60, 62 are again provided with photovoltaic solar cells 68 on one surface, and airfoils 64, 66 have ailerons 72, 73 to provide roll control. There is no tail or extensive fuselage in this embodiment; airfoils 60, 62, 64 and 66 are attached around a reduced core structure 70. Propeller mechanisms generally designated by the reference numerals 75, 76, 77 and 78 are located at the outer ends of the airfoils 60, 62, 64 and 66. Bracing wires 81, 82, 83 84, 85, 86, 87 and 88 are attached between the airfoils 60, 62, 64 and 66, completing this arrangement.

An electric motor 39 (shown diagrammatically) is mounted in the fuselage 38 and has a shaft 40 which drives the propeller 30 to power the aircraft. It is well known in the art that photovoltaic cells generate direct current from solar energy which can be used to power the motor 39. Wiring from the solar cells to the motor is of conventional design. The FIG. 2 embodiment would have a motor at each wing tip to power the propellers 75-78.

A control center 49 (shown diagrammatically) is located in the fuselage 38 in the vicinity of wing point attachment. The control center may be a radio control or a small computer. The radio control may be operated from a ground station to determine the flight path. Both systems are known in the art. In the FIG. 1 embodiment the control center actuates the ailerons 34 and 36 to control flight, the tail 32 can also be used for control. In the FIG. 2 embodiment the ailerons 72 and 74 are utilized, as well as the differential thrust of the propellers. The actual mechanism for moving the control surfaces is believed to be well known in the art. Batteries are located at the control center or in the areas of the solar cells to store energy for use during dark hours.

Operation of the solar-powered airplane follows the conventional mode with regard to energy capture, use and storage. Returning to FIG. 1, the solar-powered airplane 10 may be directed to a station-keeping flight pattern, often referred to as a racetrack or oval pattern. The airfoils 24 and 26 allow the airplane to be flown in such a pattern at a bank angle sufficient to maintain solar cells 28 normal to the sun. In operation, the solar cells 28 will be exposed to maximum solar energy during all daylight hours.

The lift and induced drag of a cruciform wing are independent of the roll angle for a given angle of attack of the roll axis, and are equal to these quantities for a horizontal monoplane of the same span. This is shown mathematically, where $L_H$ = lift of normally horizontal wing,
$L_V$ = lift of normally vertical wing,
$L_o$ = reference value of lift (value of lift of one wing in horizontal orientation),
$\phi$ = angle of roll of wing system, and
$V$ = vertical force developed by wing system.

When a cruciform wing of high aspect ratio is rolled about an axis which is tilted in a vertical plane with respect to the airstream, and the zero lift lines of the wings are assumed to be aligned with this axis, the lift of each wing normal to its span is $$L_H = L_o \cos \phi$$

$$L_V = L_o \sin \phi$$

The vertical components of these lift forces reflect the vertical force of the combination $$V = L_H \cos \phi + L_V \sin \phi$$

$$V = L_o (\cos^2\phi + \sin^2\phi) = L_o$$

Lift is thus seen to be independent of the bank angle for a given tilt of the roll axis. At a bank angle of 45°, the angle of attack of each wing is only 0.707 times that of the horizontal wing at 0°. The cruciform wing will therefore develop a higher value of maximu lift when $\phi = 45°$ than when $\phi = 0°$.

The velocities induced on one wing by the flow field of the other wing are in a spanwise direction and, to the first approximation, have no effect on lift or drag. Where $D_{i,H}$ = induced drag of normally horizontal wing,
$D_{i,V}$ = induced drag of normally vertical wing, and
$K$ = ratio of induced drag to square of lift, $$D_{i,H} = KL_H^2 = KL_o^2 \cos^2\phi$$

$$D_{i,V} = KL_V^2 = KL_o^2 \sin^2\phi.$$

The total drag is therefore $$D_{i,H} + D_{i,V} = KL_o^2(\cos^2\phi + \sin^2\phi) = KL_o^2$$

The induced drag of the cruciform wing is thus independent of bank angle for a given tilt of the roll axis.

Some aerodynamic penalty is incurred with use of the cruciform wing arrangement. Profile drag of the cruciform wing is roughly twice that of a horizontal monoplane of the same span. The alternate embodiment shown in FIG. 2 is designed to partially offset the increase in profile drag. The fuselage and tail are omitted, and replaced with a reduced core structure 70. Pitching and yawing moments required for control and stability are provided by differential thrust of the propeller mechanisms 75, 76, 77 and 78 mounted near the tips of airfoils 60, 62, 64 and 66.

In FIGS. 1 and 2, bracing wires 41-48 and 81-88 are shown as connecting the vertical and horizontal airfoils. In solar airplanes designed to date, the value of wing loading is low: 15 to 30 N/m² as compared to 469 N/m² for a four-place personal airplane or 4650 N/m² for a modern jet transport. An externally braced wing is desirable; conventional construction includes vertical king posts or cabane struts to support the bracing wires. In the present invention, each wing braces the airfoils located at right angles thereto, eliminating a former source of drag.

By using batteries for storing energy generated during daylight hours it is contemplated that the aircraft can be flown for days in a station keeping mode. It is also contemplated that the aircraft may climb to an ideal altitude during solar hours and glide during dark hours to conserve energy in the station keeping mode.

Launching and landing of the present invention may be accomplished in any of several ways. The aircraft could be carried aloft on a balloon, or launched from a dolly. Safe recovery of the aircraft may be less important for a pilotless vehicle intended to stay aloft for a long period of time. Landing could be by means of a parachute or return to a dolly. Water landing might also be considered.

The specifications herein discussed are not meant as limitations on the scope of the invention and its underlying theory. The above description of various embodiments are examples of the novel structure herein claimed.

What is claimed and desired to be secured by Letters Patent of the United States is:

1. An aircraft comprising:

airfoil means having surfaces normal to each other for sustaining free flight of the aircraft;

solar cells carried by at least one of said airfoil means surfaces for powering the flight of the aircraft;

control means for orienting said airfoil means normal to the path of the sun's rays; and means for constantly maintaining said solar cells normal to the path of the sun's rays during an uninterrupted flight from at least sunrise to sunset.

2. An aircraft as in claim 1, wherein said means for maintaining said airfoil means normal to the path of the sun's rays includes first and second airfoil means, said second airfoil means having a spanwise axis normal to a spanwise axis of the first airfoil means.

3. An aircraft as in claim 2, wherein said first airfoil means has an upper surface and a lower surface, and wherein said solar cells are positioned on said upper surface.

4. An aircraft as in claim 3, having a fuselage, propeller mechanism mounted on the nose of said fuselage and a tail mounted on the aft end thereof, said first airfoil means and said second airfoil means being attached to said fuselage, said control means having components within said fuselage, said fuselage having a motor for driving said propeller, and said solar cells providing energy for operating said propeller and flying said aircraft.

5. An aircraft as in claim 3, wherein said first airfoil means and said second airfoil means have tips, and wherein said control means include propeller means located at said tips.

6. An aircraft as in claim 2, having bracing means fastened between said first airfoil means and said second airfoil means.

7. An aircraft as in claim 2, wherein said second airfoil means have ailerons.

8. An aircraft as in claim 6 wherein said bracing means are wires.

9. An aircraft as in claim 1 wherein energy storage means is carried by said aircraft, and said solar cells operate to charge said energy storage means.

10. An aircraft as in claim 6 wherein said second airfoil means has ailerons located in the area of the tips thereof.

* * * * *